(12) United States Patent
Ginda et al.

(10) Patent No.: US 8,825,507 B1
(45) Date of Patent: Sep. 2, 2014

(54) SYSTEM AND METHOD FOR SELF-SCHEDULING OF SERVICE REPRESENTATIVES

(75) Inventors: Robert G. Ginda, Mountain View, CA (US); Lloyd Tabb, Santa Cruz, CA (US); Michael Toy, Los Altos, CA (US)

(73) Assignee: Liveops, Inc., Palo Alto, CA (US)

(*) Notice: Subject to any disclaimer, the term of this patent is extended or adjusted under 35 U.S.C. 154(b) by 2046 days.

(21) Appl. No.: 11/346,677

(22) Filed: Feb. 3, 2006

(51) Int. Cl.
*G06Q 10/00* (2012.01)

(52) U.S. Cl.
USPC .................... 705/7.13; 705/7.16; 379/265.05; 379/265.09

(58) Field of Classification Search
CPC . H04M 3/5233; H04M 3/5175; H04M 3/523; H04M 3/5232; G06Q 10/06; G06Q 10/063116; G06Q 10/06312; G06Q 10/1097; G06Q 10/06315
USPC ........................................ 705/7.13, 7.25, 7.16
See application file for complete search history.

(56) References Cited

U.S. PATENT DOCUMENTS

| | | | |
|---|---|---|---|
| 5,903,641 A | | 5/1999 | Tonisson |
| 5,918,207 A * | | 6/1999 | McGovern et al. ............ 705/321 |
| 5,946,375 A * | | 8/1999 | Pattison et al. .......... 379/112.01 |
| 6,104,788 A * | | 8/2000 | Shaffer et al. .............. 379/93.17 |
| 6,493,446 B1 * | | 12/2002 | Cherry ...................... 379/265.05 |
| 6,535,601 B1 | | 3/2003 | Flockhart et al. |
| 6,542,602 B1 * | | 4/2003 | Elazar ....................... 379/265.06 |
| 6,553,114 B1 | | 4/2003 | Fisher et al. |
| 6,574,605 B1 * | | 6/2003 | Sanders et al. .................... 705/8 |
| 6,587,831 B1 * | | 7/2003 | O'Brien ........................ 705/7.16 |
| 6,766,012 B1 | | 7/2004 | Crossley |
| 6,832,203 B1 * | | 12/2004 | Villena et al. ...................... 705/8 |
| 6,856,680 B2 * | | 2/2005 | Mengshoel et al. ...... 379/265.06 |
| 6,970,829 B1 * | | 11/2005 | Leamon ............................. 705/9 |
| 7,062,031 B2 | | 6/2006 | Becerra et al. |
| 7,124,164 B1 * | | 10/2006 | Chemtob ....................... 709/204 |
| 7,127,059 B2 * | | 10/2006 | Galvin ...................... 379/265.03 |
| 7,158,628 B2 | | 1/2007 | McConnell et al. |
| 7,188,073 B1 * | | 3/2007 | Tam et al. ..................... 705/7.16 |

(Continued)

FOREIGN PATENT DOCUMENTS

EP 1310886 A1 * 5/2003

OTHER PUBLICATIONS

Hollman, L., Keeping on Schedule with Workforce Management Software, Apr. 2001, Call Center Magazine vol. 4, Iss. 14, pp. 70-82.*

(Continued)

*Primary Examiner* — Tiphany Dickerson
(74) *Attorney, Agent, or Firm* — Duane Morris LLP (57) ABSTRACT

A system and method for facilitating service representatives' self-scheduling of work. Work may be released for a given work period (e.g., one week) in multiple rounds, with the period being broken into multiple timeslots, each timeslot having one or more seats for representatives. A representative may be limited as to the number of timeslots he can commit to in a given scheduling round. A representative operates a user interface to access his personalized schedule, which indicates the status of each timeslot through different appearances (e.g., colors, line patterns). The representative commits to timeslots that have work available for which he is qualified, and the schedule is updated in real-time as work availability changes. Seats may be distributed among multiple virtual rooms in a timeslot, and a representative may need to be qualified to sit in a special room.

44 Claims, 7 Drawing Sheets

(56) References Cited

U.S. PATENT DOCUMENTS

| | | | |
|---|---|---|---|
| 7,246,076 B2* | 7/2007 | Vajracharya et al. | 705/7.21 |
| 7,283,971 B1* | 10/2007 | Levine et al. | 705/9 |
| 7,343,316 B2* | 3/2008 | Goto et al. | 705/9 |
| 7,499,869 B2* | 3/2009 | Iknoian | 705/7.16 |
| 7,747,956 B2* | 6/2010 | Zaner et al. | 715/751 |
| 8,401,884 B1* | 3/2013 | Kinney | 705/7.18 |
| 2001/0002831 A1* | 6/2001 | Kato et al. | 345/326 |
| 2001/0024497 A1 | 9/2001 | Campbell et al. | |
| 2003/0026414 A1* | 2/2003 | Baker et al. | 379/265.13 |
| 2003/0208391 A1* | 11/2003 | Dvorak et al. | 705/8 |
| 2005/0043986 A1 | 2/2005 | McConnell et al. | |
| 2008/0046305 A1* | 2/2008 | Garcia et al. | 705/9 |
| 2008/0313005 A1* | 12/2008 | Nessland et al. | 705/9 |

OTHER PUBLICATIONS

Douglas S. Binder, Cameron S. Crandall, Mark Hauswald, Use of a self-selected scheduling method in a large academic emergency medicine group, Annals of Emergency Medicine, vol. 41, Issue 5, May 2003, pp. 653-658, (http://www.sciencedirect.com/science/article/pii/S019606440300091X).*

U.S. Appl. No. 10/886,333, Off. Action, Everingham et al.

U.S. Appl. No. 10/817,350, Everingham.

"Still Leaving It to Fate?: Optimizing Workforce Management," Durr, William Jr., Nov. 2001, pp. 1-5.

U.S. Appl. No. 10/886,333, filed Jun. 5, 2008, Everingham et al.

* cited by examiner

Legend 302

| | | | |
|---|---|---|---|
| [8:10 striped] Not committed | | 1 | 0 – 10 minutes handling calls |
| [8:10 plain] Committed | | 2 | 10 – 20 minutes handling calls |
| | | 3 | 20 - 30 minutes handling calls |
| ☺ Satisfied commitment | | ⚠ | Did not satisfy commitment |

Status Area 304

Monday, December 1          Commit performance: 88%

| 0:10 ☺ 3 | 1:10 ☺ 3 | 2:10 | 3:10 | 4:10 | 5:10 | 6:10 | 7:10 |
|---|---|---|---|---|---|---|---|
| 0:40 ☺ 3 | 1:40 ⚠ 2 | 2:40 | 3:40 | 4:40 | 5:40 | 6:40 | 7:40 |

| 8:10 | 9:10 | 10:10 | 11:10 | 12:10 ☺ 3 | 13:10 ☺ 3 | 14:10 | 15:10 |
|---|---|---|---|---|---|---|---|
| 8:40 | 9:40 | 10:40 | 11:40 ☺ 3 | 12:40 ☺ 3 | 13:40 2 | 14:40 | 15:40 |

| 16:10 ☺ 3 | 17:10 1 | 18:10 | 19:10 ☺ 3 | 20:10 ☺ 3 | 21:10 1 | 22:10 | 24:10 ⚠ 1 |
|---|---|---|---|---|---|---|---|
| 16:40 ☺ 3 | 17:40 | 18:40 | 19:40 ☺ 3 | 20:40 ☺ 3 | 21:40 | 23:40 | 25:40 ☺ 3 |

History 300

My Schedule

Last Updated: 01-03-2006 18:18  Update Now (Call center time: 18:18)

☐ Block time has passed
▨ Open for commitments
▨ Current commitment
☐ Pending cancellation ?
☐ Closed for commitments
  Unforecast block
✱ Bonus offered
ᴺᴿᶠ No charge for committing
* Contains [ -- Select Program -- ▼ ]

Note:
- All times are Eastern Time, in Military (24 hour) format.
- Forecast information is automatically refreshed every three minutes.

History View

Tuesday, January 3, 2006                    74 commits remaining

Committed as: PHILOSOPHY

| 0:10 | 1:10 | 2:10 | 3:10 | 4:10 | 5:10 | 6:10 | 7:10 | 8:10 | 9:10 | 10:10 | 11:10 |
| 0:40 | 1:40 | 2:40 | 3:40 | 4:40 | 5:40 | 6:40 | 7:40 | 8:40 | 9:40 | 10:40 | 11:40 |
| 12:10 | 13:10 | 14:10 | 15:10 | 16:10 | 17:10 | 18:10 | 19:10 | 20:10 | 21:10 | 22:10 | 23:10 |
| 12:40 | 13:40 | 14:40 | 15:40 | 16:40 | 17:40 | 18:40 | 19:40 | 20:40 | 21:40 | 22:40 | 23:40 |

Commit performance
100%

SYSTEM AND METHOD FOR SELF-SCHEDULING OF SERVICE REPRESENTATIVES

BACKGROUND

This invention relates to the field of computer systems. More particularly, a system and methods are provided for enabling service representatives or agents (e.g., telephone agents) to self-schedule their work times.

Presently, work schedules of service representatives and other types of agents, independent contractors and employees are usually generated by their employer or the organization that contracted for their services. Although some individual service representatives' preferences may be accommodated (e.g., for vacation), generally the representatives are unable to pick and choose among various days and timeslots, during which work is available, in order to arrange their own work schedules. In other words, their schedules are generally set for them by someone else; they cannot self-schedule their work times.

This arrangement may succeed well in many situations, particularly in work environments in which representatives work extended periods of time per shift. For example, a call center that employs agents working regular work shifts (e.g., 5 days per week and 8 hours per day), a recurring schedule set by the call center may be acceptable to all parties.

However, if the workload for an organization's service representatives varies from hour to hour or day to day, such that the number of service representatives needed to handle the expected level of work fluctuates, this type of scheduling may be inefficient. For example, if a service representative encounters a more pressing need for his time (e.g., an emergency), he will have little choice other than simply not showing up for work. In particular, there is no mechanism in place for the representative to easily un-schedule himself from all or part of a work shift when that shift is part of a schedule set by the organization. Because representatives cannot schedule themselves for work, they cannot easily update their schedules in real-time or volunteer for last minute work opportunities.

SUMMARY

In one embodiment of the invention, a system and methods are provided for facilitating agents' or service representatives' self-scheduling of work. A work period (e.g., one week) for which work is released is divided into timeslots (e.g., of half-hour duration), and one or more seats are created in each timeslot during which calls requiring the agents handling are expected.

Seats may be grouped into virtual rooms, with different rooms corresponding to different products sought by the callers, different agent skills or talents (e.g., foreign language), different agent ratings or rankings, etc.

An agent accesses her personalized schedule on a client device; the schedule reflects the status of each timeslot in the work period with regard to that agent. Thus, a timeslot may have work available (e.g., open seats), but if the agent is not qualified for the room(s) containing those seats the timeslot will not appear in the agent's schedule as having work available. The agent commits to timeslots having work available to her, and corresponding commit requests are issued to a scheduling system.

Her schedule is updated in real-time as her requests to commit to timeslots (and un-commit from timeslots) are resolved, and as work availability changes due to other agents' self-scheduling. An agent may be freely uncommitted from a timeslot she had committed to, or the timeslot may first be moved to a "pending un-commit" status and only become uncommitted after another agent commits to a seat in the same timeslot or room.

Available work may be released in multiple rounds, with some percentage of the number of seats needed for a room being released in each round. To promote fairness, a commit budget may be enforced to limit the number of commitments an agent may make in a round.

In one embodiment of the invention, a commit budget may be affected by an agent's performance in handling calls, by how well the agent meets her commitments (e.g., her commit performance) and/or other factors. In addition, the length of time into the future that an agent may self-schedule may depend upon her seniority and/or other factors. Thus, a senior agent may be able to see available work further in advance than a junior agent.

In an embodiment of the invention, a scheduling system for facilitating agents' self-scheduling may comprise one or more databases for holding data associated with media events describing products, wherein calls are expected to be received for the products during timeslots associated with the events. The databases may also store various data used to facilitate the agents' self-scheduling (e.g., commit budgets, commit performance, agent seniority, number of seats in rooms and/or timeslots).

The scheduling system may also include a scheduling server (e.g., a web server) for publishing work to agents and serving their schedules, a room scheduler for creating virtual room and populating them with seats, a media event editor for estimating how many agents are needed for handling calls expected to be spawned by a media event, and/or other components.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and methods are provided for facilitating self-scheduling work and/or other activities. Implementations of this embodiment of the invention are described herein with regard to the self-scheduling of telephone agents that handle calls from people seeking to obtain a product or service advertised in a media event (e.g., a radio or television commercial, an infomercial), but may be readily modified for scheduling of other resources in other environments.

In this embodiment, service representatives or agents access and modify their work schedules using a graphical user interface that presents a period of time (e.g., three days, five days, a week) as a set of timeslots, blocks or other elements. Timeslots may be of uniform size (e.g., half hour, hour) or variable size. The schedule presented to an agent is unique to that agent, but may be derived from a common schedule of available work.

The agent may select timeslots during which is work available and commit to working those timeslots, and may be able to un-commit from committed timeslots. Because the schedule accessed by an agent is specific to her, some timeslots may be available to her but not to another agent, and vice versa, based on her training, skills, seniority, ranking, etc.

As described in more detail below, in this embodiment of the invention each timeslot in the agent's schedule is presented to the agent with an appearance that indicates whether the timeslot is open or closed (i.e., whether there is work available for which the agent is qualified), whether the agent has committed to working the timeslot, the type of work involved, whether a bonus or incentive is offered for working the timeslot, etc. A timeslot may be considered available for or open to an agent if the agent is qualified to handle the corresponding work (e.g., the type of calls expected to be received or the product for which calls are expected to be received), and a threshold (e.g., maximum) number of agents needed for the timeslot have not already requested to work it. When an agent requests and is granted a particular timeslot, the agent is considered "committed" to the timeslot.

When an agent requests a timeslot via his or her user interface, a commit request is transmitted to a scheduling server from the agent's client device. If the agent's request is granted, the agent's schedule is updated to show the new commitment. The schedule may also update automatically on a regular or periodic basis, and/or the agent may be able to request a real-time update.

Figure 1:
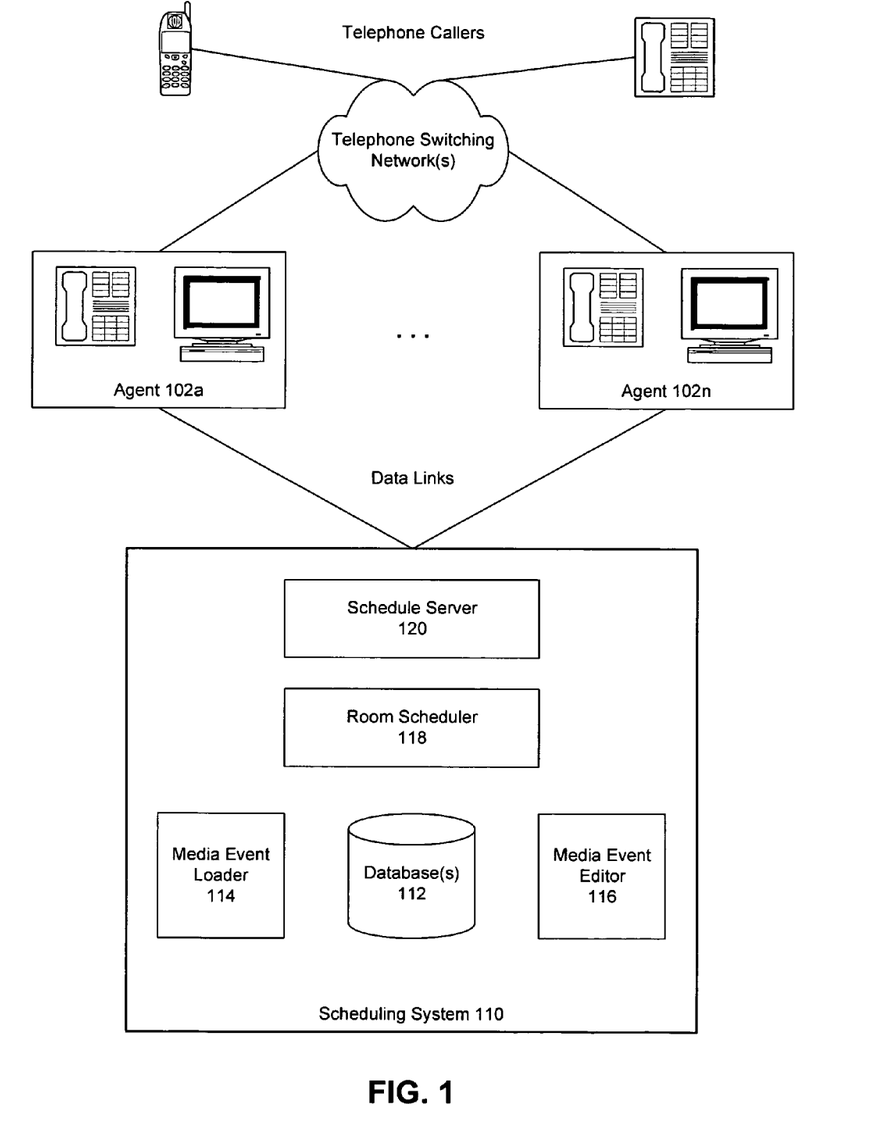
FIG. 1 is a block diagram depicting a computing environment in which an embodiment of the invention may be implemented.

FIG. 1 is a block diagram of an illustrative system for facilitating service representatives' self-scheduling of work times, according to one embodiment of the invention. In this embodiment, scheduling system 110 is operated by an organization that provides agents or service representatives for handling calls from people interested in obtaining a good or service advertised in a media event (e.g., a commercial), but may instead be operated by a third party. Specifically, agents 102 may be employees or independent contractors of the organization operating or providing scheduling system 110.

In this embodiment of the invention, agents 102 operate client devices (e.g., computer systems, personal digital assistants) in order to communicate with the scheduling system. Agents also operate telephone equipment for receiving and handling calls from telephone callers via the PSTN (Public Switched Telephone Network), VoIP (Voice over Internet Protocol), wireless carriers and/or other telephone service providers. Agents' client devices may be coupled to scheduling system 110 via any type of data communication links, wired and/or wireless, including switched data networks such as the Internet.

In the illustrated embodiment of the invention, scheduling system 110 comprises one or more databases 112, media event loader 114, media event editor 116, room scheduler 118 and schedule server 120. The system components depicted in FIG. 2 may include general or special purpose software and/or hardware for generating, serving and/or manipulating data, such as a web server, a database server and so on. In other embodiments of the invention, a scheduling system may be configured differently to include more or fewer components. In particular, the functionality of scheduling system 110 described herein may be merged or distributed in different ways among a different collection of system components.

Databases 112 are configured to store some or all of the data described herein. The data may be used, among other purposes, to determine agent requirements (i.e., how many agents are needed to work a particular time period), track agent performance in handling calls and/or working the timeslots they commit to working, facilitating agents' self-scheduling, storing schedule data, etc.

Media event loader 114 is configured to load into a database 112 media event data provided by a product provider. A media event may be broadcast on any type of medium (e.g., television, radio, worldwide web), to advertise or describe a product (e.g., a good or service) for sale or lease. The data may be received in virtually any data and/or file format, and may be converted into a standard format by the media event loader. Data loaded into a database by the media event loader may be stored in a particular table (e.g., a Media Event table).

Media event data loaded by media event loader 114 may include the date/time of a media event, the channel (e.g., television channel, radio station) on which the event will be broadcast, the event's duration, a product associated with the event, etc. The data may also include a number of calls the product provider expects to receive during a time period associated with the event. The media event loader (or some other component of the scheduling system) may also load data associated with the product, such as provider, price(s), description, options, etc.

Media event editor 116 is configured to work with data loaded into a database by the media event loader (and/or other system component(s)), and may be used to view media event data relating to any number of products, product providers, media events, etc. In particular, media event editor 116 allows an operator to retrieve and edit media event data meeting virtually any criteria specified by the operator.

In one embodiment of the invention, media event editor 116 is used to generate a "calls expected" value for a media event. In particular, media event editor 116 may retrieve a product provider's expected number of calls (if provided) and generate a new or updated estimate of the number of calls to be received for the product during a particular timeslot (e.g., a timeslot during which the media event is broadcast). The estimate may be generated automatically by the editor or manually with an operator's assistance, and may draw upon historical data (e.g., stored in database 112) revealing how many calls were received for the product during one or more previous timeslots.

In one implementation, the "calls expected" value is generated by adjusting the product provider's estimate in some manner. The adjustment may be modified differently for later timeslots as the number of calls actually received during one or more earlier timeslots are compared with "calls expected" values for those earlier timeslots. The adjustment may also, or instead, be based on the accuracy of the product provider's estimates of how many calls will be received. A "calls expected" value may be stored in the Media Event table and/or some other table of a database 112.

In an embodiment of the invention, when agents are needed to work a particular timeslot to handle calls received during that timeslot, one or more "rooms" are created in which to "place" the agents. Instead of allowing any call to be handled by any agent, certain calls (e.g., for specified products, from callers speaking languages other than English) may be routed to special rooms. Different rooms may be established, therefore, for different products (e.g., if a product provider wants specially trained agents to handle calls for the product), for different pools or sets of agents (e.g., agents able to speak different languages, agents who have certain agent rankings) and/or for other reasons. A common or general room may be used to group agents not placed in any specialized room.

Room scheduler 118 is configured to manage the creation of rooms and schedule them for use during appropriate timeslots. For example, if a specialized room is created for agents who have received special training to handle calls for a particular product, that room will be scheduled for use during timeslots that calls are expected to be received for that product. In one implementation, the room scheduler maintains a Rooms table defining different rooms (e.g., based on the product(s) the room is used for or the qualification(s) or training an agent must have to join the room) and a Room Schedule table identifying the dates/times the rooms will be used.

Thus, based on media event data (e.g., from a Media Event table) indicating when certain media events will be broadcast, room scheduler 118 may create a room if necessary (e.g., if the media event data indicates that agents having particular training or qualifications are needed or desired to handle calls) and schedule it (and/or other rooms) during a timeslot encompassing or near a time at which the event will be broadcast.

In the embodiment of the invention depicted in FIG. 1, room scheduler 118 is also responsible for generating, from a media event's "calls expected" value, a preferred number of agents for a corresponding timeslot to handle calls prompted by the media event (i.e., how many agents are needed to work during that timeslot to handle the expected calls for the related product). Each agent needed for a particular room within a given timeslot may be referred to as a "seat" within the room.

In one implementation, the generation of a preferred number of agents or seats may involve applying a multiplier to "calls expected." For example, a multiplier of 0.3 would imply that each agent working the timeslot can handle approximately 3 calls (the inverse of the multiplier) during the timeslot, and that 30 agents are required for every 100 calls expected during the timeslot.

Multipliers may be specific to individual products or media events. In other implementations, other equations or functions may be applied to the "calls expected" value to generate the preferred number of agents or seats.

In one embodiment of the invention, work may be made available to agents for self-scheduling all at once. In other words, for a given time period (e.g., one week), all timeslots during which agents are needed during that period may be offered to agents at one time and all seats within the rooms in those timeslots may be released at one time. Agents then perform self-scheduling as described further below.

However, in another embodiment of the invention, work may be released to agents in rounds or phases. In particular, instead of making all work available at once, portions (e.g., percentages) of the seats required for a room or timeslot may be released for self-scheduling over time. For example, for a work period of one week, during a first round 40% of the seats within each room of each timeslot during which work is available may be released. During a second round another 20% may be released, and so on. Illustratively, the rounds begin before the work period commences and may end before or after the work period commences.

To assist in this phased manner of releasing work, room scheduler 118 may also be responsible for generating the number of "seats available," in each round, for each timeslot that has work available. As one skilled in the art will appreciate, this method of releasing work may be implemented in various ways, some of which will be described in more detail below.

Finally, room scheduler 118 is also configured to release or publish work to agents to make the seats available to the agents. In particular, when agents request their schedules, which inherently include forecasts of work available to them, room scheduler 118 is the component that determines how many seats to make available in different rooms, when to make more seats available, when to close a room (e.g., because the preferred number of agents have been committed), whether to allow an agent to un-commit from a timeslot, etc.

Schedule server 120 comprises a web server or other interface for communicating with agents' client devices. In particular, the schedule server may receive (e.g., via HTTP or HyperText Transport Protocol) agents' schedule requests, commit requests, un-commit requests and so on. Schedule server 120 and room scheduler 118 may be merged in one implementation of scheduling system 110.

Figure 2:
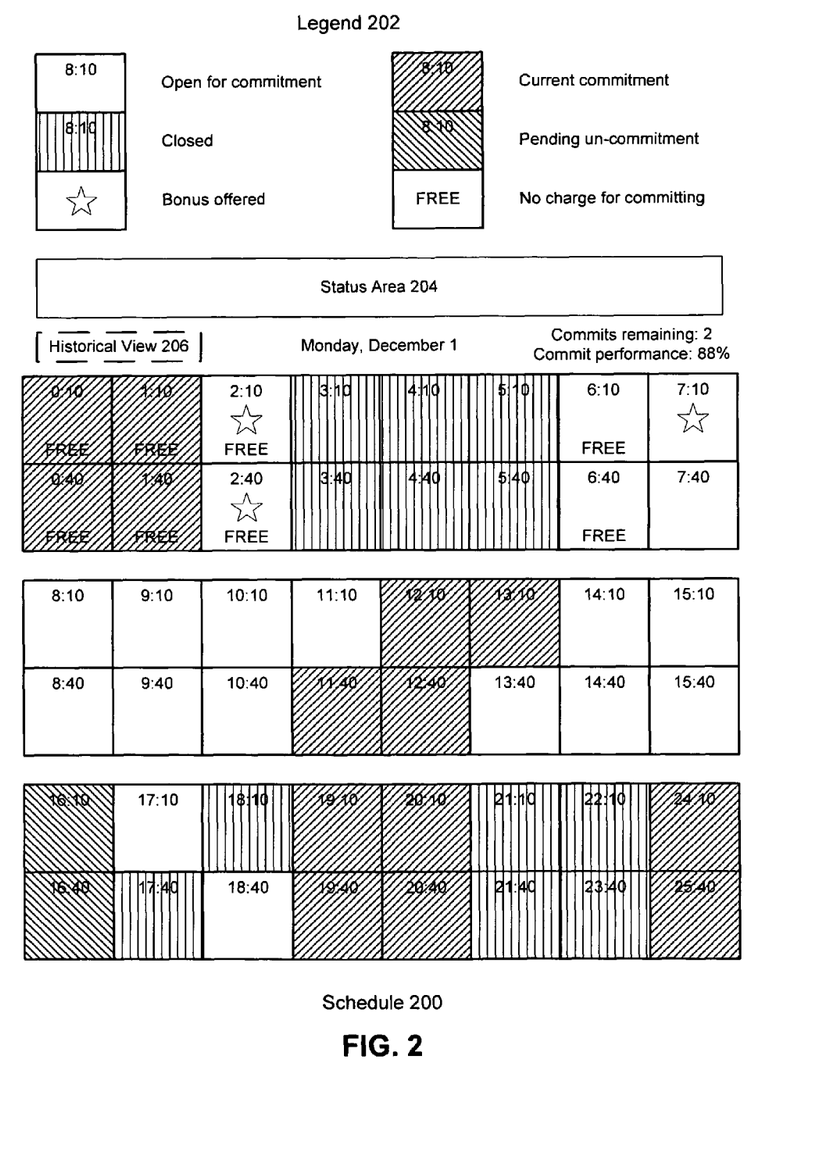
FIG. 2 depicts an agent's self-scheduling interface for facilitating the agent's self-scheduling, in accordance with an embodiment of the present invention.

FIG. 2 depicts a graphical user interface for facilitating an agent's self-scheduling of her work times, according to an embodiment of the invention. In this invention, a period of time during which the agent can schedule her work hours is presented as a collection (e.g., a grid) of timeslots. By clicking on a timeslot or accessing a menu (e.g., a drop-down menu associated with one or more timeslots), the agent may commit herself to working the timeslot, request to be un-committed from a committed timeslot, determine what type of work is available during the timeslot (e.g., what rooms are open), etc.

In the embodiment of the invention depicted in FIG. 2, the agent's schedule is part of a static HTML (HyperText Markup Language) page served from a scheduling system such as the system depicted in FIG. 1. The page may be accessed from an agent's browser via appropriate links on other pages or menus.

Schedule 200 in FIG. 2 may cover only a single day (i.e., Monday, December 1), or additional days may be accessed by scrolling the display. In other embodiments of the invention virtually any period of time may be presented to an agent for self-scheduling (e.g., 3 days, 5 days, 7 days, 1 month). In one implementation, different agents may be presented or may be able to access different periods of time for self-scheduling. For example, one agent having a higher rating or more seniority than another agent may be able to self-schedule further into the future than the other agent. Illustratively, agents may be rated or ranked on the basis of how well they handle telephone calls, how often or how completely they meet their work commitments, their success in selling a product, etc.

The schedule is broken into half-hour slots in the illustrated embodiment, and the slots are offset from the hour and half-hour because the media event(s) expected to spawn calls during the slots may not be broadcast until a commercial break occurs during a program that starts on the hour or half-hour.

Schedule 200 is presented to the agent after she logs into the scheduling system. The schedule is personalized to the agent by indicating the status of each timeslot with respect to her only. Thus, a particular timeslot may indicate that the viewing agent can commit to work the timeslot while some other agent's schedule for the same time period may indicate that he cannot commit to work that timeslot (e.g., because of a lack of specialized training, because he has already scheduled a threshold amount of work).

Schedule 200 may be updated automatically (e.g., every 3 minutes) and/or whenever the agent requests. Illustratively, an "update" control may be included in the schedule to allow her to initiate an update. The schedule may also be updated when the agent changes her schedule in some way (e.g., by committing to a timeslot).

Status area 204 may be used to provide instructions to the agent (e.g., to help the agent perform self-scheduling), display system information (e.g., to indicate when another scheduling round will occur), display scheduling information (e.g., reveal how many seats or what rooms are available in a timeslot the agent has moused-over), and/or other information.

Legend 202 correlate timeslot appearances to their status. In the illustrated embodiment of the invention, which may be well-suited for a monochrome display or a color-blind agent, different statuses are indicated by different cross-hatching or line patterns within a timeslot's background or foreground. In other embodiments of the invention other timeslot attributes may be used to indicate their status (e.g., color, size, shape).

In schedule 200, a blank timeslot indicates that the agent may commit to work the timeslot, while different non-blank line patterns indicate that the timeslot is closed, that the agent has already been committed to the timeslot or that the agent has requested to be un-committed from the timeslot. Illustratively, a timeslot may be closed if there is no work available during the timeslot (e.g., no media events), if the number of seats established within the timeslot's rooms have been committed, if the timeslot is in the past or future, and/or for other reasons.

In other embodiments of the invention, a timeslot may have some other status. For example, past timeslots may have a particular status and appearance to indicate they are in the past. Similarly, timeslots for which no forecast of work available have been generated may also have a different status and appearance to indicate they are in the future (e.g., beyond the agent's accessible work period, beyond the full work period in which any seats have been released). In the illustrated embodiment of the invention, however, past and future timeslots are displayed with the same appearance as closed timeslots.

In this embodiment of the invention, the agent may be permitted to commit to only a limited number of timeslots for some period of time after new seats are released, so that other agents are sure to have a chance to self-schedule.

In particular, an agent may be granted a "commit budget" indicating how many commitments she may make, within the current round of self-scheduling or overall within the time period accessible by the agent. As she commits to working timeslots, her budget is decremented accordingly, and may be indicated on schedule 200 as "Commits remaining" or with some other label. Her success in meeting her commitments (e.g., "Commit performance") may also be identified.

In one implementation, in order for an agent to meet her commitment to work a timeslot, she must be "available" for a specified portion or percentage of the timeslot. For example, she may be required to be available for 25 minutes of every 30 minute timeslot. Being "available" may be defined differently in different embodiments of the invention. For example, to be considered available she may need to be online (e.g., logged in and connected to the scheduling system) and available to take a call (or currently handling a call). As long as she is handling a call, she may be considered available, even if she has logged out (e.g., to ensure that the current call will be her last).

An agent may be considered "logged in" as long as she is connected to (e.g., logged into) the scheduling system or a presence server. She may be put into a "paused" state if a ping to her client device is unanswered or if she fails to answer a call routed to her. Notification of this status may be displayed on her client device. While paused, no calls will be routed to her and she may have to activate a control displayed on her client device to exit the paused state. If the agent is paused for a threshold period of time (e.g., 5 minutes) during a timeslot she has committed to, she may be considered to have failed to satisfy her commitment (and her commitment performance may suffer).

A supervisor or an operator of the scheduling system may be able to forgive a missed commitment. If an error occurs in the scheduling system that may make it difficult or impossible for agents to meet their commitments, some or all of them may be excused from those commitments. As described elsewhere, a low commit performance may decrease an agent's commit budget, may cause fewer calls to be routed to her (e.g., because she is given a lower rating or ranking) and/or may have other repercussions.

A timeslot may be marked with one or more icons or labels to indicate that the timeslot is special in some way. For example, one icon (e.g., a star) may be used to indicate that the agent will earn a bonus for working the timeslot. If the agent mouses-over the timeslot or the icon, or takes some other specified action, the type of bonus (e.g., extra pay per minute or per call, guaranteed minimum pay) and/or the reason for the bonus may be revealed.

In the illustrated embodiment of the invention, another icon or label (e.g., the word FREE) is used to indicate that the agent can commit to working during the timeslot without it counting toward the threshold number of commitments the agent is permitted to make. A timeslot marked FREE may also be marked to indicate whether the timeslot is free for everyone or only for agents having training or a skill/talent the agent possesses. Mousing-over a free timeslot may reveal why the timeslot is free; for example, a room associated with a product for which the agent has been trained may be identified in status area 204. Not all seats in a timeslot marked free may be free—after the free seats are filled, agents may need to use their commit budgets to commit to the timeslot.

As described above, in the illustrated embodiment of the invention, work may be released to agents in phases or rounds. That is, in a first round a first percentage of the total number of seats within a room or timeslot may be released for self-scheduling. In each subsequent round, additional seats may be released for commitment.

In one implementation of the illustrated embodiment of the invention, work schedules may have a maximum length of one week (e.g., Monday through Sunday). In this implementation, the first round of self-scheduling for a particular week may commence on the preceding Thursday. After the first round (e.g., Thursday morning), additional rounds may be held at regular or irregular intervals until the last seats are released (e.g., on Saturday or Sunday).

In each round, the agent's commit budget is refreshed or increased accordingly. The agent's commit budget in a round may depend on several factors, such as her seniority, the period of time the agent is permitted to see in her self-schedule (e.g., which may depend on her seniority as described above), her agent rating or ranking (e.g., better agents may be granted higher budgets), her training (e.g., an agent with more training may be qualified for more types of work), her commit performance, etc.

Although not depicted in the embodiment of the invention depicted in FIG. 2, the seats of each timeslot during which work is available may be grouped into any number of rooms, as described above. If only one room is established (e.g., a General or Common room), then all agents committed to working that timeslot will be "seated" in that room. And, all calls received during that timeslot will be routed to agents in that room. Thus, an agent in that single room will handle a call regardless of the product desired by the caller.

Conversely, a specialized room may be created in a timeslot if special training is offered or required for handling calls for a product having a media event broadcast during or near the timeslot, if a product provider requests a dedicated pool of agents, if a pool of agents having certain experience (e.g., familiarity with the product) or talent (e.g., ability to speak a particular language) is available, and/or for other reasons.

An agent qualified to sit in a specialized room may be automatically seated in that room if she commits to that timeslot (and a seat is available in the room). For example, committing to a timeslot may cause the agent to be automatically placed in the "best" room for which she is suited, based on her training, her skills, her agent ranking, any bonuses offered for working a timeslot or a particular room, the amount of money she is likely to earn, etc.

Alternatively, an agent may be able to select which of multiple rooms in a timeslot she would like to commit to. Illustratively, when the agent mouses-over a timeslot having multiple rooms with seats available, a list or menu of those rooms may be displayed (e.g., in status area 204 of FIG. 2).

When multiple rooms exist in a timeslot, calls received during that timeslot may be routed to agents based on the corresponding product, agent rankings, agent skills or training, etc. U.S. patent application Ser. No. 10/817,350, entitled "Results-Based Routing of Electronic Communications" and filed Apr. 1, 2004, describes how calls may be routed to agents within a call routing system or by a call manager, and is hereby incorporated by reference.

In schedule 200 of FIG. 2, if the agent wishes to un-commit from a timeslot, she must specifically request to be un-committed (e.g., by clicking on the committed timeslot and choosing the appropriate action). If she simply does not work during that timeslot, her commit performance will be affected, which may affect her agent ranking, her commit budget and/or other statistics.

When she requests un-commitment from a timeslot, that timeslot is updated to indicate the timeslot is now "Pending un-commitment" and the agent's seat is added to the number of seats available in the timeslot. In this embodiment of the invention, an agent is not un-committed from a timeslot until a different agent subsequently commits to the same timeslot (and, possibly, the same room in which the agent would have been seated). In one implementation, an agent may be granted a grace period (e.g., 10 minutes) after committing to a timeslot, during which she can freely un-commit without requiring another agent to commit to the same timeslot.

In other embodiments of the invention, un-commitment may be handled differently. For example, an agent may be un-committed immediately upon request (e.g., from any committed timeslot or room, from any FREE timeslot or room), or may be un-committed only after all seats in the specified timeslot or room have been filled.

Because an agent may be un-committed from a timeslot at virtually any time, another agent may be able to self-schedule that released timeslot at any time until the timeslot begins. Alternatively, an agent may only be allowed to un-commit from a timeslot up until some period of time (e.g., 30 minutes, 1 hour) before the timeslot.

In addition, agents may be able to work during a timeslot without being scheduled, by simply connecting to the scheduling and/or call handling system and making herself available. She may, however, receive fewer calls and/or be paid less than someone who was scheduled to work.

In one embodiment of the invention, seats are released for agents' self-scheduling according to the following schedule, in which the work period is one week (e.g., Monday through Sunday). In round 1, 40% of weekday seats and 60% of weekend seats are released. In rounds 2 and 3, another 20% of weekday seats and 15% of weekend seats are released. In round 4, the final 20% of weekday seats and 10% of weekend seats are released. The rounds may occur with fixed regularity (e.g., every 12 hours) or with variable timing. In other embodiments, a different number of rounds may be employed over a longer or shorter period of time.

During each round, an agent may only commit to a number of timeslots equal to her commit budget, but may un-commit and modify her schedule as desired without exceeding her commit budget. As described above, however, free timeslots may be committed to without regard for her commit budget.

In an alternative embodiment of the invention, scheduling rounds may not end until after the work period has commenced. For example, a work period may run from Friday through the following Thursday, and the first scheduling round may occur each Thursday, with the final round not completing until Saturday or Sunday. In this alternative embodiment, however, seats for timeslots in the early part of the work period (e.g., Friday through Sunday) may be fully released anytime prior to the timeslots.

In one embodiment of a scheduling system for facilitating agents' self-scheduling, a number of seats greater than the preferred number of agents for a room or timeslot may be released. For example, for some or all timeslots during a work period (e.g., timeslots in which agents are more likely to fail to satisfy their commitments), the system may release seats numbering 110% of the preferred number of agents. The number of seats may be returned to the preferred number after all scheduling rounds have been held, or near the end of the scheduling rounds.

At that point, a timeslot may be over-committed, so that a greater number of agents is committed than is expected to be needed. Agents committed to that timeslot may then freely un-commit without passing through the pending un-commit phase.

As described previously, any number of rooms may be established for a timeslot, with seats reserved for agents having special training, skills or ratings. A room may be visible (i.e., on her self-schedule) only to agents qualified to sit in the room. Thus, a room may be used to reserve a number of timeslot seats for qualified agents, and may be associated with a particular product or agent skill/talent.

Calls received for the product or that may benefit from an agent's special qualifications are preferably routed to an agent in the room, but may be routed to an unqualified agent (e.g., if all qualified agents are handling calls). Agents in a special room may also handle calls that are not for the associated product or that do not require the agents' skills.

In one embodiment of the invention, a timeslot may be free for agents qualified to sit in a specialized room (i.e., a room other than the General or Common room) open during the timeslot. An agent committed to a specialized room may be able to freely un-commit from the timeslot, or may have to pass through the pending un-commit phase and hope that another qualified agent commits to the room.

A highly rated agent (e.g., an agent having a high success rate in converting calls to sales, an agent having relatively high sales amounts) may be granted access to more rooms and/or receive a higher commit budget as a reward. An agent's commit budget may also fluctuate according to her commit performance, with agents having the highest commit performance receiving the highest commit budgets.

Schedule 200 of FIG. 2 is tailored to the viewing agent and only presents work the agent is qualified to handle, and only during a period of time the agent is permitted to access. The schedule may include a control (not shown in FIG. 2) for marking or selecting all timeslots meeting an agent's specified criteria, such as specialized room(s), associated products for which calls are expected, bonuses, free timeslots, etc.

Figure 3:
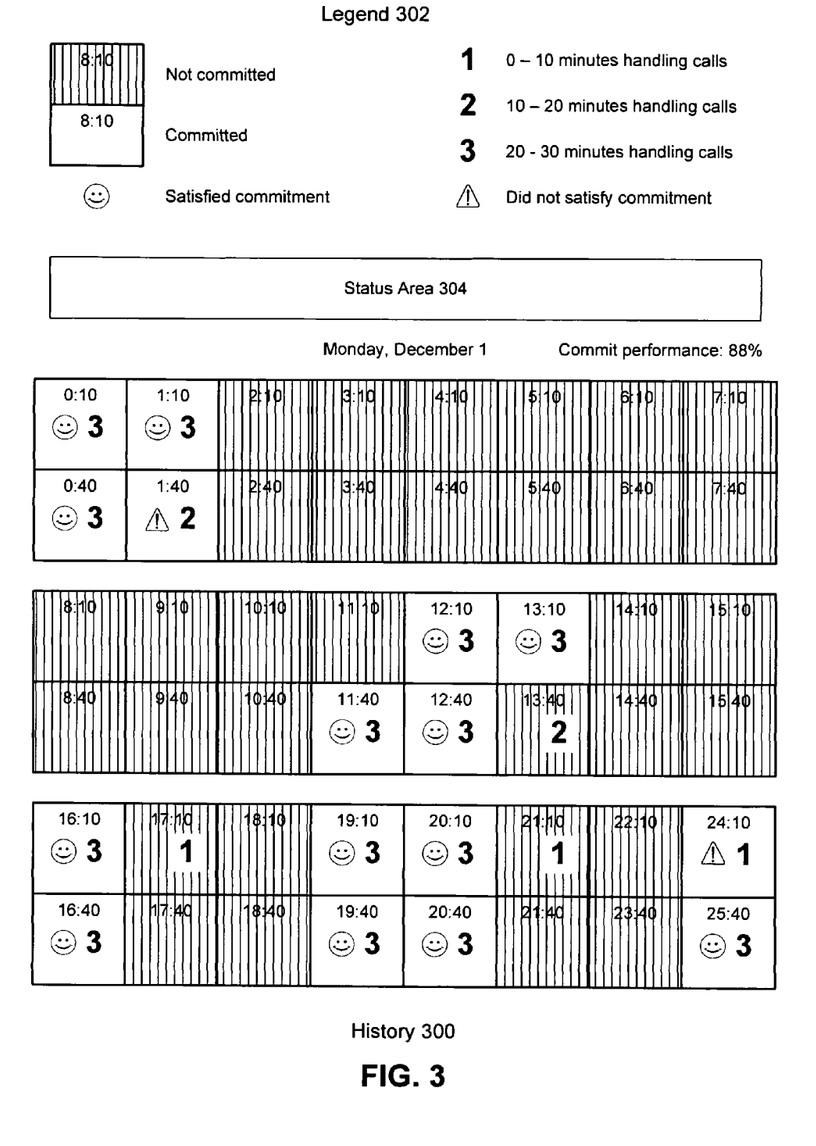
FIG. 3 depicts an historical view of a past work period with regard to an agent, to show the agent's performance, according to one embodiment of the invention.

Schedule 200 may also include historical view control 206, which allows the agent to access a view of one or more past work periods or timeslots. FIG. 3 depicts a historical view of an agent's self-scheduled work, according to one embodiment of the invention.

Historical view 300 reveals the agent's performance during the work period depicted in schedule 200 (i.e., December 1). Legend 302 shows the meanings of the various symbols and timeslot patterns, while status area 304 displays context-sensitive information. For example, the agent may mouse-over a timeslot, or select one or more timeslots that she worked, and statistics regarding her work may be shown (e.g., amount of time available for calls, amount of time spent handling calls, number of calls handled).

As with schedule 200 of FIG. 2, different line patterns or cross-hatching may be used to quickly identify which timeslots the agent was and was not committed to. In one alternative embodiment of the invention, another pattern may be used for timeslots that were in the "pending un-commit" status. In different embodiments of the invention, if the agent is not released (i.e., un-committed) from such a timeslot prior to the beginning time of the timeslot, she may be considered committed or un-committed to the timeslot. Different colors or other appearances may be used in other embodiments of the invention.

The agent's success in meeting her commitments during the illustrated period of time is reported as her "Commit performance" for the period. Any past period of time may be displayed in an historical view, not just one day as depicted in FIG. 3. As with schedule 200, scroll bars may be provided to scroll the displayed view.

In historical view 300, different icons (e.g., a smiley face and a warning symbol) are used to indicate whether the agent did or did not satisfy her commitment to work a timeslot. A different set of icons or labels (e.g., "1", "2", "3") is used to indicate the amount of time she spent handling calls during a timeslot. Illustratively, agents may be paid per unit of time spent handling calls.

In other embodiments of the invention, a historical view or other view of an agent's past work or a past time period may be presented differently, with different icons. For example, instead of simply indicating that an agent failed to satisfy a committed timeslot, a particular icon may indicate whether the agent was available at all during the timeslot. Another icon may be used to indicate that the agent received no calls during a timeslot.

Also, a control may be provided in historical view 300 for changing the time period in the view. For example, the agent may be able to page backward and forward through past work periods, one period (e.g., one week) at a time.

An operator of the scheduling system that produces schedule 200 and/or historical view 300 may be able to access a master schedule of past, present and/or future work periods. Among other information, the master schedule may reveal the number of seats (e.g., total seats, committed seats, open seats) within a timeslot and/or the timeslot's rooms. The operator may also be able to interactively adjust a number of seats, open or close a room or timeslot, release an agent from a pending un-commit phase, modify an agent's commit budget or the period of time she may access, establish or modify a bonus associated with a room or timeslot, make a room or timeslot free, and so on.

Figure 4:
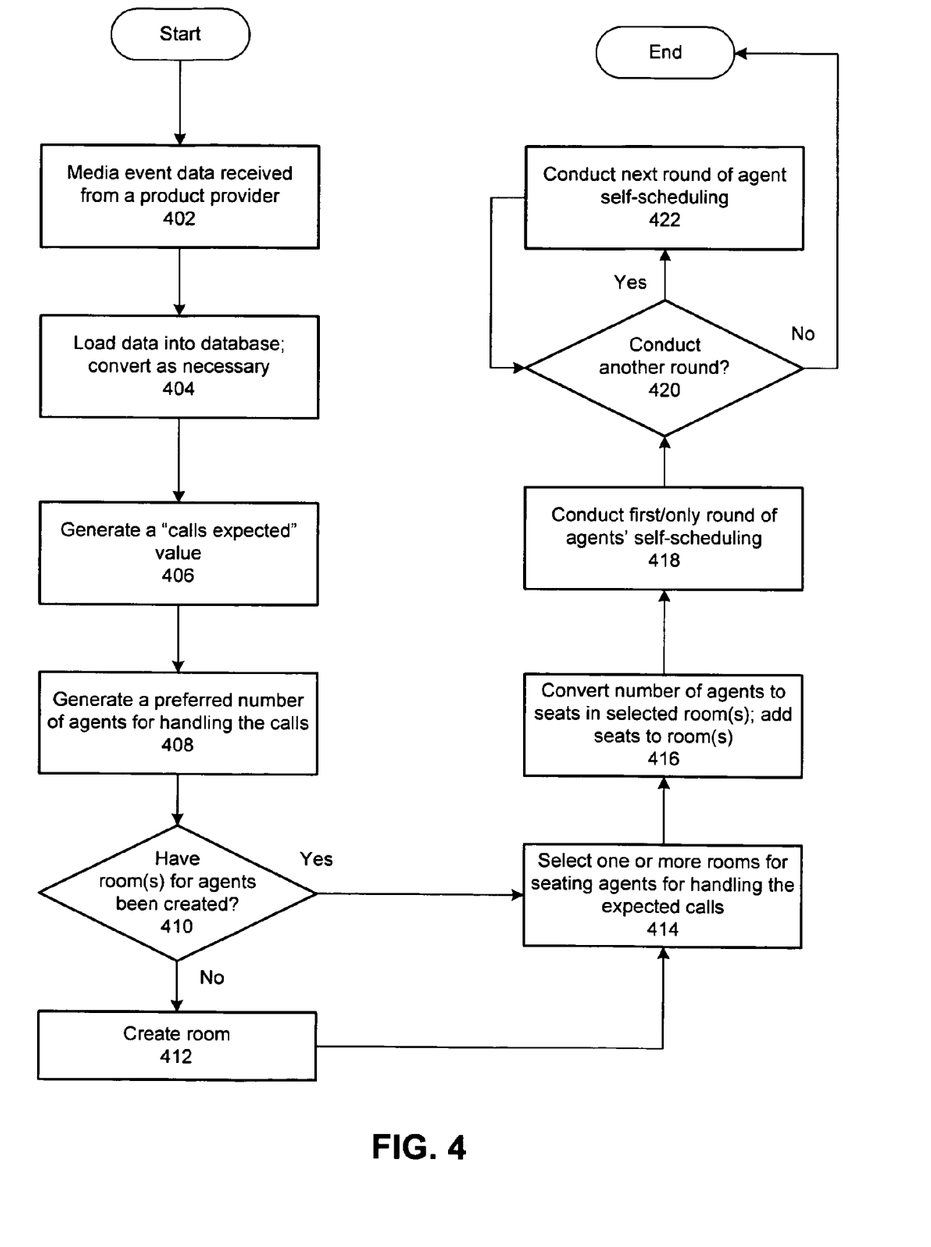
FIG. 4 is a flowchart demonstrating one method of making work available to agents for self-scheduling, according to one embodiment of the invention.
Figure 5:
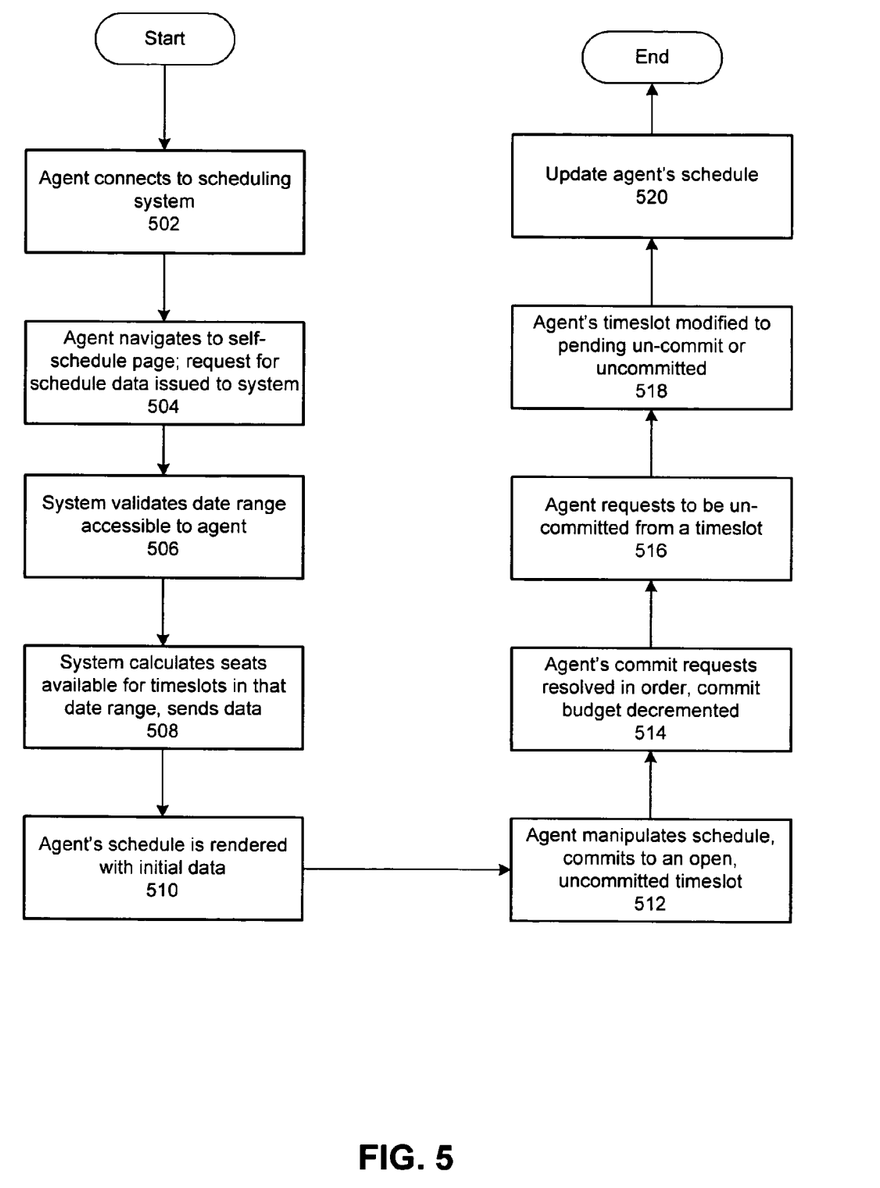
FIG. 5 is a flowchart illustrating one method of facilitating an agent's self-scheduling, in accordance with an embodiment of the invention.

FIGS. 4-5 demonstrate methods of facilitating self-scheduling of work for agents or service representatives according to one embodiment of the invention. FIG. 4 is directed to a method of generating scheduling data (e.g., number of seats, which rooms to open), while FIG. 5 is directed to a method of self-scheduling an agent.

In operation 402 of FIG. 4, the scheduling system receives a media event or media event data from a product provider. As described above, a product provider may be an organization that offers a good or service for sale or lease to telephone callers. A media event may be a commercial or other event broadcast by itself (e.g., an infomercial) or during a media program (e.g., a television show).

In this embodiment of the invention, the media event data may identify a cost of the event, the time and channel/station/URL on which the event will be broadcast and/or other information. The data also includes the product provider's estimate of how many calls will be received in association with the media event (e.g., during a timeslot in which the event is broadcast). This estimate is not required in other embodiments of the invention.

In operation 404, the media event data is loaded into a database or other repository. This may be done in a media event upload process. The data may be converted as part of the upload process, to put it into a common format for later manipulation.

In an embodiment of the invention, updates to the media event data may be received later. An update may be uploaded in the same fashion, and may completely replace the preceding set of data, or may simply be applied to update the preceding dataset.

In operation 406, an operator or automated process (e.g., a media event editor) manipulates the media event data to generate a "calls expected" value, based on the product provider's estimate and/or other information (e.g., media event cost, time, historical data from a previous broadcast of the same or similar event). The manipulation may simply involve a lookup in a table configured to map the event and/or provider's estimate to the calls expected value, or may involve the application of a more complicated equation. The value may be stored in the database or elsewhere.

In operation 408, the calls expected value is converted into a preferred number of agents for handling the number of calls expected to be spawned by the media event. This may involve the application of a multiplier reflecting how many calls for the associated product an agent is believed to be able to handle during the event's timeslot.

In operation 410, an operator or automated process (e.g., a room scheduler) determines whether the agents for handling calls for the product should be seated in an existing room, or whether a new room needs to be created. Illustratively, a Common or General room is automatically created for every timeslot during which a media event will be broadcast.

A specialized room may be created, as described above, if a product provider requests one, if it is determined that agents having specialized training should handle some or all calls for the product, if a particular talent or skill (e.g., a foreign language) may be useful to handle some expected calls, or for other reasons.

When seated, an agent will be added to the General room unless a specialized room has been created and the agent has the training/skill/rating needed to sit in that room.

In operation 412, a new (e.g., specialized) room is created, and may be specific to a particular product, a particular agent skill/talent, an agent rating or ranking, or some other factor(s).

In operation 414, one or more rooms are selected for receiving seats for the preferred number of agents calculated in operation 408. Illustratively, if all calls for the associated product are to receive specialized handling (e.g., by agents having special training for the product, by agents having a special skill or knowledge, by agents having ratings above a threshold), a single specialized room may be selected for seating all agents needed to handle the expected calls.

Instead, however, the preferred number of agents need not all be seated in the same room. For example, some of them may be seated in a specialized room, but others may be seated in the General room. In this example, a call for the product may be preferably routed to the specialized room, but routed to the General room if no agents in the specialized room can take the call.

Thus, in operation 416, seats are added to the selected room or rooms. There may be a 1:1 correspondence between the preferred number of agents and seats added to the room(s). Or, some multiplier greater than 1 may be applied to the preferred number of agents to yield an inflated number of seats before distributing the seats among the room(s). As described previously, the number of seats may be later reduced.

In operation 418, a first scheduling round is held to release some (or all) of the available seats in each timeslot for a given time period (e.g., one week) and some or all rooms within those timeslots. The number or percentage of seats to release may be specified by an operator or selected by an automated process.

In operations 420-422, additional seats are released in additional rounds of self-scheduling as necessary or desired. After all seats are released, the method of FIG. 4 exits. Any or all of the data described above may be stored in one or more databases within the scheduling system, or at some other location.

With reference now to FIG. 5, in operation 502 an agent connects to a scheduling system. The scheduling system may comprise or may be part of a larger call management system for managing agents and/or routing calls, such as a system described in U.S. patent application Ser. No. 10/817,350. The agent may login to the call management system and be automatically coupled to the scheduling system, or may directly log into the scheduling system.

The agent is presented with any number of pages of information via a browser operating on her client device. The pages may include scripts for handling calls, a communication utility (e.g., message board, instant messaging) for communicating with a supervisor and/or other agents, and various other information regarding the handling of calls and scheduling of work. In particular, as one option in a menu or as some other control within one of the pages viewed in her browser, the agent is offered a link to her work schedule.

In operation 504, the agent selects the link or control and a "get schedule" request is issued to the scheduling system (e.g., a scheduling server, a web server). A blank schedule may be first presented to the agent (e.g., with a grid of timeslots having uniform appearance) while the client device awaits the necessary schedule data.

In one embodiment of the invention, agents' schedules are driven by javascript or some other scripting language. When the initial (blank) schedule is loaded, the javascript initiates the get schedule request. This request may be sent out-of-band via a hidden I-frame, and indicates that all schedule data are needed (not just an update).

In operation 506, the system validates a data range for the work period to be presented to the agent. Illustratively, if the agent is a new agent she may only be able to see a limited portion (e.g., 3 days) of the full work period (e.g., one week). A relatively senior agent may be able to access the full work period). The system thus checks the agent's identity (e.g., and seniority) to determine how much of the work period to reveal to the agent.

In operation 508, for each timeslot in that date range that has a media event scheduled, the system calculates how many seats are available.

Illustratively, for each timeslot the system accesses one data table (e.g., a Room Schedule table) to determine how many seats have been released in each room in the timeslot. Another data table (e.g., a Committed table) yields the number of agents that have already committed to those seats (if any). The number of seats available is then reported to the agent's client device. Various other data may also be forwarded to the agent's client, such as the agent's remaining commit budget, her commit performance, instructions for performing self-scheduling, etc. Scheduling data may be served to the agent's client as javascript objects.

In the illustrated embodiment of the invention, the scheduling system only sends seats available information to the agent for rooms (and timeslots) the agent is qualified for. Therefore, the agent will not see rooms that she is not qualified to sit in, even if there are open seats in the room. In one alternative embodiment of the invention, the agent's client device may be trusted to block schedule data as necessary for preventing the agent from seeing or accessing seats that she is not qualified to occupy.

In operation 510, the agent's personalized schedule is filled in to reflect the current scheduling information. Thus, as described above, different timeslots are displayed with different appearances and/or different icons or labels to reveal their status as regards this agent (e.g., closed, committed, pending un-commit, open for commitment, free, bonus).

In operation 512, the agent manipulates the schedule as desired, to determine what rooms exist in open timeslots, to learn why a timeslot or room is free, to identify what type of bonus is offered for a particular timeslot or room, etc. At some point, the agent commits to an open, uncommitted timeslot or room that she is qualified for.

In operation 514, a commit request is issued to the scheduling system from the agent's client device. Illustratively, each commit initiated by the agent is queued on the client (or elsewhere) and issued in the order of their initiation when the previous commit is resolved. Thus, in this embodiment of the invention, only one commit request at a time may be in flight for a given agent. Other embodiments may be configured differently.

In response to the request, the scheduling system again checks the number of seats that have been released for the agent's requested room and subtracts the number of agents that have already committed to the room. The system may also determine whether the agent has any required training, skill, talent or rating needed to sit in the room, whether the agent has a sufficient commit budget to commit to the room (i.e., if it is not free), whether the requested timeslot falls within the agent's accessible work period, etc. The system responds with an acknowledgement and increments the number of committed agents, or issues a negative acknowledgement if the agent cannot be added to the room.

In an embodiment of the invention, if multiple rooms are established in a timeslot that the agent wants to commit to, she may be considered first for the room that is best for her. The best room may mean the room that offers the best remuneration, the room with the most attractive bonus, a free room, etc. If she cannot be seated in that room, she may be automatically considered for other rooms. If she requests a seat in a free room, but she cannot be seated in any free room in the timeslot, she may be automatically seated in a non-free room or she may be informed of the situation and asked if she would like to use her commit budget and accept the offered seat.

Thus, in operation 514, the agent's commit requests are issued and resolved in order. Illustratively, as each request (for commitment, un-commitment or other) is resolved, the affected timeslot is updated accordingly to reflect its appearance and status, and the agent's commit budget is decremented as necessary. The client browser may allow the agent's commit budget to be exceeded when issuing commit requests, but the scheduling server will not allow the agent to exceed her budget.

In operation 516, the agent requests un-commitment from a committed timeslot or room. An un-commit request is issued to the scheduling system. Un-commit requests may be queued and handled similar to commit requests.

In response to the request, the system determines whether the agent can be freely uncommitted or whether she should be first moved to a pending un-commit status for the timeslot. Illustratively, if the room is free or is over-committed to, or if the agent is very highly rated agent and/or has a very high commit performance, she may be automatically uncommitted. Otherwise, her status for the timeslot will be "pending un-commit," but may be automatically changed to uncommitted (and her commit budget may be incremented) if and when another agent commits to the same room in the same timeslot.

In operation 518, the agent's schedule is updated to change the requested timeslot status to uncommitted or pending un-commit, as appropriate.

In operation 520, the agent's schedule is updated, automatically or manually. In the illustrated embodiment of the invention, the agent may initiate a real-time update by activating a corresponding control on the schedule page. Also, however, her schedule may be automatically updated on a periodic basis (e.g., every 3 minutes).

When an update request is issued by the client device or browser, it transmits a token or other object or data to identify to the scheduling system the data it currently has or the data it needs. For example, a token provided to the client device during a previous update may be configured with any number of time values configured to indicate how up-to-date the schedule is. The time values may correspond to statuses of different data tables (e.g., a Room Schedule table, a Committed table). When the system receives the token as part of the subsequent update request, it uses the time values to determine which data should be sent to the agent.

The updated data may therefore cause the statuses of any number of timeslots to change, depending on whether the number of seats available in the timeslots room has changed.

In other embodiments of the invention, scheduling data may be generated and updated, and agents may perform self-scheduling, with methods different from those described above and depicted in FIGS. 4-5 without exceeding the scope of the invention.

Advantageously, because of the real-time nature in which the scheduling data evolves, agents may be motivated to keep an eye on their schedules around times they are available to work but not committed. If additional seats are suddenly released (e.g., because of last-minute notification of a media event), agents may quickly detect the available work and commit to it.

In one alternative embodiment of the invention, instead of automatically committing all agents who commit to a particular timeslot or room, a number of agent requests may be accumulated and seats may be granted to the requesting agents using some criteria (e.g., agent rating, agent commit performance).

In another alternative embodiment of the invention, a first version of agents' self-schedules may be generated by the scheduling system and then modified as desired by the agents. Illustratively, the agents may submit preferences to the system (e.g., work times, products they prefer handling calls for, preferred rooms) and the system may then generate their initial schedules based on the submitted preferences and/or other criteria (e.g., agent seniority, agent rating or ranking, commit performance).

Figure 6:
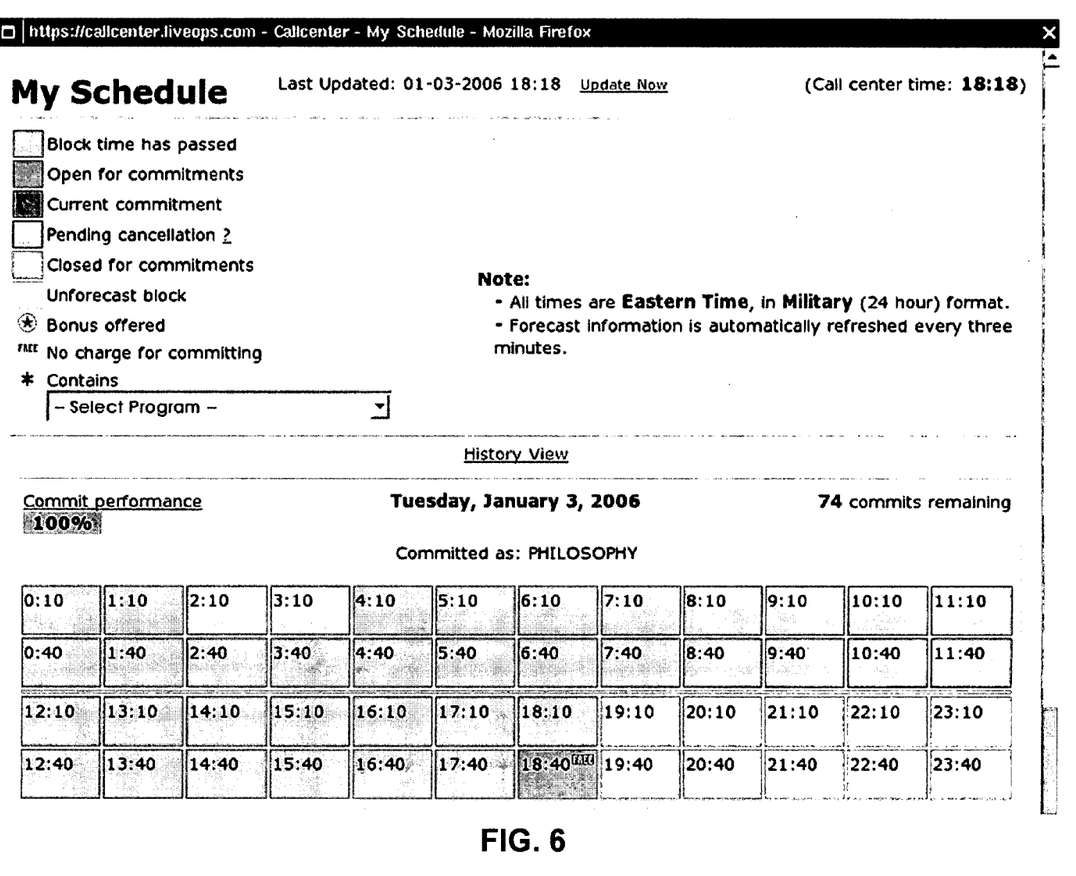
FIG. 6 is a black and white rendition of a color screenshot of a personalized self-schedule interface according to a first alternative embodiment of the invention.

FIG. 6 is a screenshot of an agent's interface for self-scheduling (i.e., her personalized schedule) from one alternative embodiment of the invention. Although the interface is actually displayed in color on the agent's client device, the figure is rendered in black and white in FIG. 6, thereby making the differences between different timeslot statuses less apparent.

In this embodiment, it can be seen that the 2:10 and 3:10 timeslots are "pending cancellation" (e.g., pending un-commit), timeslot 18:40 is free and has a status of "open for commitments," timeslots 19:10 through 23:40 are "closed for commitments" and the rest are in the past.

A drop-down menu is offered for displaying rooms (e.g., "programs") within a timeslot. The agent may click on a timeslot and then open the drop-down menu to see the rooms that exist in the timeslot.

Figure 7:
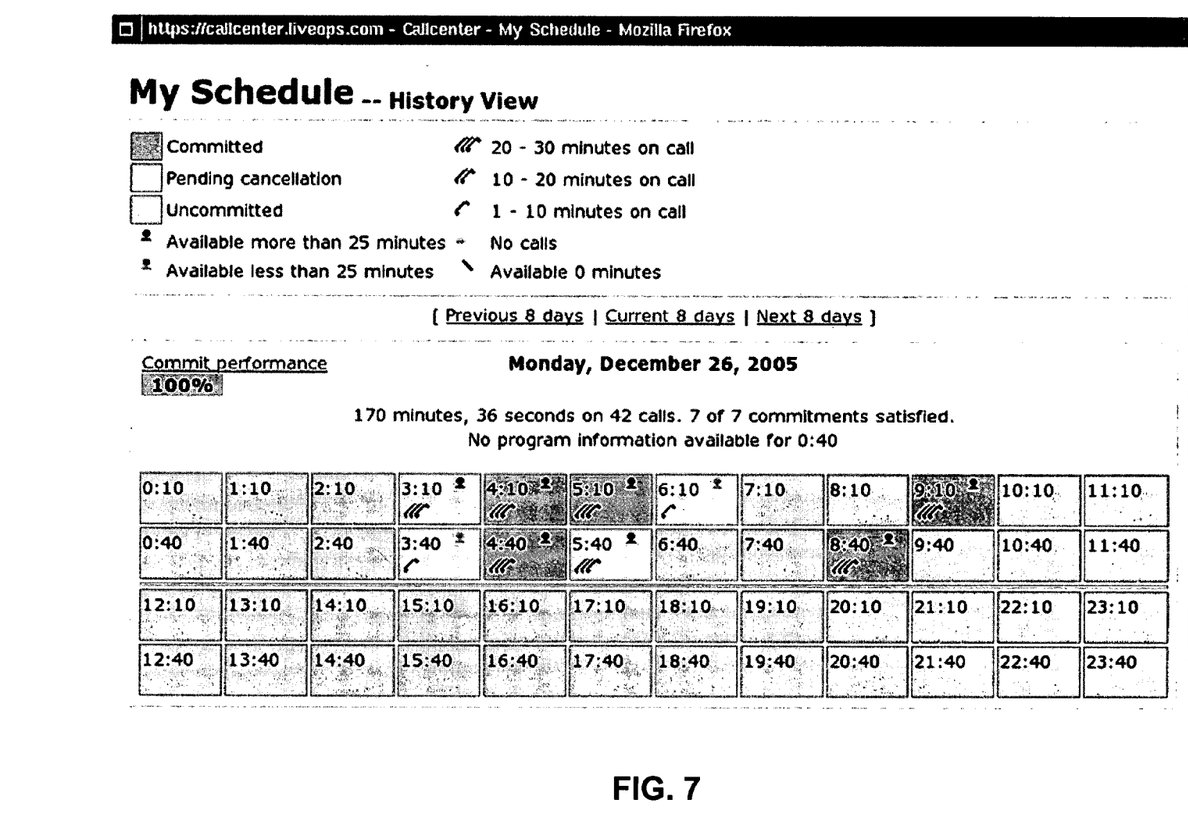
FIG. 7 is a black and white rendition of a color screenshot of a historical view of a past work period of an agent, according to the first alternative embodiment of the invention.

FIG. 7 is a screenshot of an agent's interface for viewing a past work period (e.g., an historical view) from the alternative embodiment of FIG. 6. Again, although the interface is actually displayed in color on the agent's client device, the figure is rendered in black and white in FIG. 7, thereby making the differences between different timeslot statuses less apparent.

In FIG. 7 it can be seen that the agent was committed to work the 4:10, 4:40, 5:10, 8:40 and 9:10 timeslots, and satisfied her commitment. The solid icon that appears in these timeslots and that resembles a person's head shows that the agent was available for at least 25 minutes of each committed half-hour timeslot. In each of these timeslots, the agent spent between 20 and 30 minutes handling calls, as indicated by the three telephone handset icons.

Timeslots 3:10 and 5:40 are displayed as "pending cancellation," meaning that the agent was still committed to work them, perhaps because no other agent committee to the timeslots after the agent requested to be un-committed. The agent did, however, satisfy these two commitments and spent at least 20 minutes handling calls in each.

Timeslots 3:40 and 6:10 are marked as "uncommitted," meaning that the agent was not committed to work, but worked at least part of each timeslot anyway. The single telephone icons indicate that she spent between 1 and 10 minutes handling calls in each timeslot. Illustratively, she may have handled telephone calls that stretched into these timeslots from the previous timeslots. Note that the opaque "head" icons in the 3:40 and 6:10 timeslots indicate that she did not work the minimum amount of time necessary to satisfy a commitment but, because she was not committed, this did not affect her commit performance. In this embodiment of the interface, special symbols may be used to indicate that no calls were handled by the agent in a timeslot (i.e., the "–" symbol) or that the agent not available to handle calls for any portion of a (committed) timeslot (i.e., the "I" symbol).

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. An automated computer-implemented method of facilitating telephone agents' self-scheduling for work, the method comprising, at a computing device:
    identifying a first timeslot during which a media event identifying a product will be broadcast;
    estimating a threshold number of telephone agents needed to handle calls for the product during the first timeslot;
    creating seats for the threshold number of agents in one or more virtual rooms;
    receiving from a first agent's client device a request for available work;
    transmitting to the client device a personalized schedule of work available to the first agent;
    displaying on the client device a plurality of timeslots available to the first agent, including the first timeslot, wherein:
        said timeslots graphically represent multiple periods of time selectable by the first agent to self-schedule work; and
        at least one of said timeslots includes a graphical icon indicating a status of the timeslot with regard to the first agent;
    receiving from the client device a request to to work the first timeslot; and
    committing the first agent to work the first timeslot if:
        the agent is qualified to work within a virtual room in the first timeslot; and
        the threshold number of telephone agents has not already been committed to work the first timeslot;
    granting a commit budget to the first agent, wherein the commit budget to the first agent indicates number of commitments the first agent can make within a time period accessible by the first agent to self-schedule work;
    enabling the first agent to request an update to the personalized schedule in real time when work availability and/or schedule of another agent change and to un-commit from the first timeslot the agent has been committed to and commit to a second timeslot based on changes in the work availability and/or the schedule of the another agent without exceeding the commit budget granted to the first agent;
    keeping the commit budget granted to the first agent unchanged if the second timeslot the first agent commits to is marked as free.

2. The method of claim 1, wherein said estimating comprises:
    predicting a number of calls that will be received for the product during the first timeslot; and
    determining a number of agents needed to handle the predicted number of calls.

3. The method of claim 2, wherein one or more of said predicting and said determining is based on historical data regarding a previous media event identifying the product.

4. The method of claim 2, wherein said determining comprises looking up a multiplier associated with the product.

5. The method of claim 1, wherein said creating comprises:
    determining whether a special room is desired in the first timeslot for seating agents for handling calls for the product, wherein a special room is restricted to agents having:
        specialized training for handling calls for the product;
        a special talent;
        a special skill; or
        a minimum agent rating.

6. The method of claim 5, wherein all calls received for the product during the first timeslot are routed to agents seated in a special room.

7. The method of claim 5, wherein said creating further comprises creating a General room in which to seat all agents not seated in a special room.

8. The method of claim 1, wherein said receiving a request for available work comprises:
    receiving a request for scheduling data for the first agent; and
    determining a work period the first agent is permitted to self-schedule work within, wherein the work period includes the first timeslot.

9. The method of claim 8, wherein the work period depends upon the first agent's seniority among a plurality of telephone agents.

10. The method of claim 1, wherein each timeslot displayed on the client device has one of the following statuses:
    open for commitment by the first agent;
    currently committed to by the first agent;
    pending un-commitment; or
    closed.

11. The method of claim 1, wherein said receiving a request to commit to work the first timeslot comprises:
    determining whether the first timeslot lies within a period of time during which the first agent is permitted to self-schedule work;
    determining whether the first agent is qualified to sit in a virtual room existing during the first timeslot; and
    determining whether any seats are available in a virtual room that exists during the first timeslot and that the agent is qualified to sit in.

12. The method of claim 1, further comprising after said committing:
updating the appearance of just the first timeslot on the client device to indicate the first agent has been committed to work the first timeslot.

13. The method of claim 1, further comprising:
receiving from the client device a request to un-commit from working the first timeslot; and
un-committing the first agent from the first timeslot if another agent qualified to handle calls for the product subsequently commits to the first timeslot.

14. The method of claim 1, further comprising:
automatically transmitting updated schedule information to the client device; and
automatically changing the appearances of one or more timeslots displayed on the client device to indicate their updated statuses.

15. The method of claim 1, wherein the commit budget is decremented each time the first agent commits to a timeslot unless the timeslot is identified as a free timeslot.

16. The method of claim 1, wherein the first agent's satisfaction of past committed timeslots is monitored as the first agent's commit performance.

17. The method of claim 16, wherein the first agent's commit performance affects the first agent's commit budget.

18. The automated computer-implemented method of claim 1, said graphical icon indicating a status selected from the group consisting of bonus, free, extra pay, guaranteed minimum pay, satisfied commitment, unsatisfied commitment, hours worked, availability, no calls, closed, committed, pending un-commit, open for commitment, and time actively working.

19. A scheduling system for facilitating telephone agents' self-scheduling of work during a plurality of timeslots, the system comprising:
one or more computer databases configured to store:
media event data describing a media event associated with a product; and
schedule data reflecting available work, wherein the work is made available in the form of seats that the agents may commit to; and
a web server including:
a media event editor configured to access the media event data to estimate a number of telephone calls expected to be received for the product during a first timeslot;
a room scheduler configured to:
create one or more virtual rooms in the first timeslot based on the estimate; and
generate seats in the created virtual rooms for a threshold number of agents for handling a number of calls for the product expected to be received during the first timeslot; and
storing said seats as available work in said databases; and
a schedule server configured to:
publish the seats to the agents in the form of personalized schedules the agents may modify in real-time;
graphically display the seats as available timeslots, representing multiple periods of time selectable by the agents to self-schedule work, to the agents at the agents' client devices, wherein at least one of said timeslots includes a graphical icon indicating a status of the timeslot with regard to an agent viewing the display;
receive requests from the agents' client devices indicating selections made by the agents to commit to one or more available timeslots;
grant a commit budget to the first agent, wherein the commit budget to the first agent indicates number of commitments the first agent can make within a time period accessible by the first agent to self-schedule work;
enable the first agent to request an update to the personalized schedule in real time when work availability and/or schedule of another agent change and to un-commit from the first timeslot the agent has been committed to and commit to a second timeslot based on changes in the work availability and/or the schedule of the another agent without exceeding the commit budget granted to the first agent;
keep the commit budget granted to the first agent unchanged if the second timeslot the first agent commits to is marked as free.

20. The scheduling system of claim 19, further comprising data communication links to the telephone agents, wherein the data links are used to:
transmit the schedules and updated schedule information to the agents; and
receive from the agents requests to modify their personalized schedules.

21. The scheduling system of claim 19, wherein:
the scheduling server is further configured to enforce a commit budget for each agent; and
an agent's commit budget is a maximum number of timeslots the agent may commit to working.

22. The scheduling system of claim 21, wherein an agent's commit budget is affected by the agent's rating.

23. The scheduling system of claim 21, wherein an agent's commit budget is affected by the agent's commit performance;
wherein the commit performance reflects the agent's satisfaction of commitments to working past timeslots.

24. The scheduling system of claim 19, wherein the number of future timeslots an agent may perform self-scheduling for is determined by the agent's seniority among the telephone agents.

25. The scheduling system of claim 19, said graphical icon indicating a status selected from the group consisting of bonus, free, extra pay, guaranteed minimum pay, satisfied commitment, unsatisfied commitment, hours worked, availability, no calls, closed, committed, pending un-commit, open for commitment, and time actively working.

26. A non-transitory computer-readable medium storing instructions that, when executed by a computer, cause the computer to perform a method of facilitating telephone agents' self-scheduling for work, the method comprising:
identifying a first timeslot during which a media event identifying a product will be broadcast;
estimating a threshold number of telephone agents needed to handle calls for the product during the first timeslot;
creating seats for the threshold number of agents in one or more virtual rooms;
receiving from a first agent's client device a request for available work;
transmitting to the client device a personalized schedule of work available to the first agent;
displaying on the client device a plurality of timeslots available to the first agent, including the first timeslot, wherein:

said timeslots graphically represent multiple periods of time selectable by the first agent to self-schedule work; and at least one of said timeslots includes a graphical icon indicating a status of the timeslot with regard to the first agent;

receiving from the client device a request to commit to work the first timeslot; and committing the first agent to work the first timeslot if:

the agent is qualified to work within a virtual room in the first timeslot; and the threshold number of telephone agents has not already been committed to work the first timeslot;

granting a commit budget to the first agent, wherein the commit budget to the first agent indicates number of commitments the first agent can make within a time period accessible by the first agent to self-schedule work;

enabling the first agent to request an update to the personalized schedule in real time when work availability and/or schedule of another agent change and to un-commit from the first timeslot the agent has been committed to and commit to a second timeslot based on changes in the work availability and/or the schedule of the another agent without exceeding the commit budget granted to the first agent;

keeping the commit budget granted to the first agent unchanged if the second timeslot the first agent commits to is marked as free.

27. The non-transitory computer-readable medium of claim 26, wherein said estimating comprises:

predicting a number of calls that will be received for the product during the first timeslot; and determining a number of agents needed to handle the predicted number of calls.

28. The non-transitory computer-readable medium of claim 27, wherein one or more of said predicting and said determining is based on historical data regarding a previous media event identifying the product.

29. The non-transitory computer-readable medium of claim 27, wherein said determining comprises looking up a multiplier associated with the product.

30. The non-transitory computer-readable medium of claim 26, wherein said creating comprises:

determining whether a special room is desired in the first timeslot for seating agents for handling calls for the product, wherein a special room is restricted to agents having:

specialized training for handling calls for the product;
a special talent;
a special skill; or
a minimum agent rating.

31. The non-transitory computer-readable medium of claim 30, wherein all calls received for the product during the first timeslot are routed to agents seated in a special room.

32. The non-transitory computer-readable medium of claim 30, wherein said creating further comprises creating a General room in which to seat all agents not seated in a special room.

33. The non-transitory computer-readable medium of claim 26, wherein said receiving a request for available work comprises:

receiving a request for scheduling data for the first agent; and determining a work period the first agent is permitted to self-schedule work within, wherein the work period includes the first timeslot.

34. The non-transitory computer-readable medium of claim 33, wherein the work period depends upon the first agent's seniority among a plurality of telephone agents.

35. The non-transitory computer-readable medium of claim 26, wherein each timeslot displayed on the client device has one of the following statuses:

open for commitment by the first agent;
currently committed to by the first agent;
pending un-commitment; or
closed.

36. The non-transitory computer-readable medium of claim 26, wherein said receiving a request to commit to work the first timeslot comprises:

determining whether the first timeslot lies within a period of time during which the first agent is permitted to self-schedule work;

determining whether the first agent is qualified to sit in a virtual room existing during the first timeslot; and determining whether any seats are available in a virtual room that exists during the first timeslot and that the agent is qualified to sit in.

37. The non-transitory computer-readable medium of claim 26, further comprising after said committing:

updating the appearance of just the first timeslot on the client device to indicate the first agent has been committed to work the first timeslot.

38. The non-transitory computer-readable medium of claim 26, further comprising:

receiving from the client device a request to un-commit from working the first timeslot; and un-committing the first agent from the first timeslot if another agent qualified to handle calls for the product subsequently commits to the first timeslot.

39. The non-transitory computer-readable medium of claim 26, further comprising:

automatically transmitting updated schedule information to the client device; and automatically changing the appearances of one or more timeslots displayed on the client device to indicate their updated statuses.

40. The non-transitory computer-readable medium of claim 26, further comprising maintaining a commit budget for the first agent;

wherein said commit budget represents a maximum number of timeslots the first agent may commit to work.

41. The non-transitory computer-readable medium of claim 40, wherein the commit budget is decremented each time the first agent commits to a timeslot unless the timeslot is identified as a free timeslot.

42. The non-transitory computer-readable medium of claim 40, wherein the first agent's satisfaction of past committed timeslots is monitored as the first agent's commit performance.

43. The non-transitory computer-readable medium of claim 42, wherein the first agent's commit performance affects the first agent's commit budget.

44. The non-transitory computer-readable medium storing instructions of claim 26, said graphical icon indicating a status selected from the group consisting of bonus, free, extra pay, guaranteed minimum pay, satisfied commitment, unsatisfied commitment, hours worked, availability, no calls, closed, committed, pending un-commit, open for commitment, and time actively working.

* * * * *